United States Patent
Liu et al.

(10) Patent No.: US 10,097,231 B1
(45) Date of Patent: Oct. 9, 2018

(54) RADIO TRANSCEIVER AND RF SIGNAL PROCESSING DEVICE

(71) Applicant: MEDIATEK INC., Hsin-Chu (TW)

(72) Inventors: Jiann-Huang Liu, Taipei (TW);
Shi-Wen Liu, New Taipei (TW);
Chi-Sheng Yu, New Taipei (TW);
Tzung-Han Wu, Hsinchu (TW);
Yen-Horng Chen, Hsinchu (TW);
Meng-lin Chung, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/640,667

(22) Filed: Jul. 3, 2017

(51) Int. Cl.
*H04B 1/44* (2006.01)
*H04B 7/04* (2017.01)
*H04L 12/46* (2006.01)

(52) U.S. Cl.
CPC ............ *H04B 1/44* (2013.01); *H04B 7/04* (2013.01); *H04L 12/4633* (2013.01)

(58) Field of Classification Search
CPC .......... H04B 1/44; H04B 7/04; H04L 12/4633
USPC ........................................................ 455/78
See application file for complete search history.

(56) References Cited

U.S. PATENT DOCUMENTS

2006/0009176 A1\* 1/2006 Saunders ............ H04B 7/0871
455/137

\* cited by examiner

*Primary Examiner* — Sanh Phu
(74) *Attorney, Agent, or Firm* — McClure, Qualey & Rodack, LLP

(57) ABSTRACT

An RF signal processing device includes multiple first signal receive paths receiving multiple first signals, multiple second signal receive paths receiving multiple second signals and a radio transceiver. The radio transceiver includes a first signal-processing circuit designed for processing the first signals, a second signal-processing circuit designed for processing the second signals, multiple first receive ports coupled to the first signal-processing circuit, multiple second receive ports coupled to the second signal-processing circuit, a first switch and a tunnel device. The first switch is coupled between at least one first receive port and the first signal-processing circuit. The tunnel device is coupled between the first switch and the second signal-processing circuit. The at least one first receive port coupled to the first switch is utilized to receive the first signal or the second signal.

13 Claims, 7 Drawing Sheets

RADIO TRANSCEIVER AND RF SIGNAL PROCESSING DEVICE

BACKGROUND OF THE INVENTION

Field of the Invention

The invention relates to a novel radio transceiver design, especially to a radio transceiver capable of flexibly extending the number of supported communications bands.

Description of the Related Art

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best-known example of wireless communications is the cellular telephone. Cellular telephones use radio waves to enable an operator to make phone calls to another party from many locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly used communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. Wireless Fidelity (Wi-Fi) is a technology defined by the 802.11 engineering standard that can be used for home networks, mobile phones, and video games to provide a high-frequency wireless local area network. Long-Term Evolution (LTE) is a standard for wireless communication of high-speed data for mobile phones and data terminals. It is based on the GSM/EDGE and UMTS/HSPA network technologies, increasing capacity and speed using a different radio interface together with core network improvements.

Since more and more cellular communications technologies are being developed, and most cellular communications technologies support multiple-band communications, communications apparatuses are designed to be able to support multiple cellular communications technologies and also multi-band communications.

In order to provide flexibility to allow communications apparatus manufacturers to extend the number of supported bands, novel chip designs for a radio transceiver are provided.

BRIEF SUMMARY OF THE INVENTION

An RF signal processing device and a communications apparatus are provided. An exemplary embodiment of an RF signal processing device capable of supporting multi-band RF signal processing comprises a plurality of first signal receive paths receiving a plurality of first signals from a first antenna, a plurality of second signal receive paths receiving a plurality of second signals from a second antenna and a radio transceiver. The radio transceiver includes a first signal-processing circuit designed for processing the first signals, a second signal-processing circuit designed for processing the second signals, a plurality of first receive ports coupled to the first signal-processing circuit, a plurality of second receive ports coupled to the second signal-processing circuit, a first switch and a tunnel device. The first switch is coupled between at least one first receive port and the first signal-processing circuit. The tunnel device is coupled between the first switch and the second signal-processing circuit. The at least one first receive port coupled to the first switch is utilized to receive the first signal or the second signal.

An exemplary embodiment of a communications apparatus capable of supporting multi-band RF signal processing comprises at least one primary antenna, at least one diversity antenna, a front end signal-processing circuitry and a radio transceiver. The primary antenna is coupled to a plurality of primary signal receive paths and receives a plurality of primary signals. The diversity antenna is coupled to a plurality of diversity signal receive paths and receives a plurality of diversity signals. The front end signal-processing circuitry comprises a plurality of signal-processing circuits on the primary signal receive paths and the diversity signal receive paths. The radio transceiver comprises a primary signal-processing circuit, a diversity signal-processing circuit, one or more primary receive ports, one or more diversity receive ports a first switch and a tunnel device. The primary signal-processing circuit is designed for processing the primary signals. The diversity signal-processing circuit is designed for processing the diversity signals. The one or more primary receive ports are coupled to the primary signal-processing circuit. The one or more diversity receive ports are coupled to the diversity signal-processing circuit. The first switch is coupled between at least one diversity receive port and the diversity signal-processing circuit. The tunnel device is coupled between the first switch and the primary signal-processing circuit. The at least one diversity receive port coupled to the first switch is further coupled to the primary signal-processing circuit via the tunnel device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
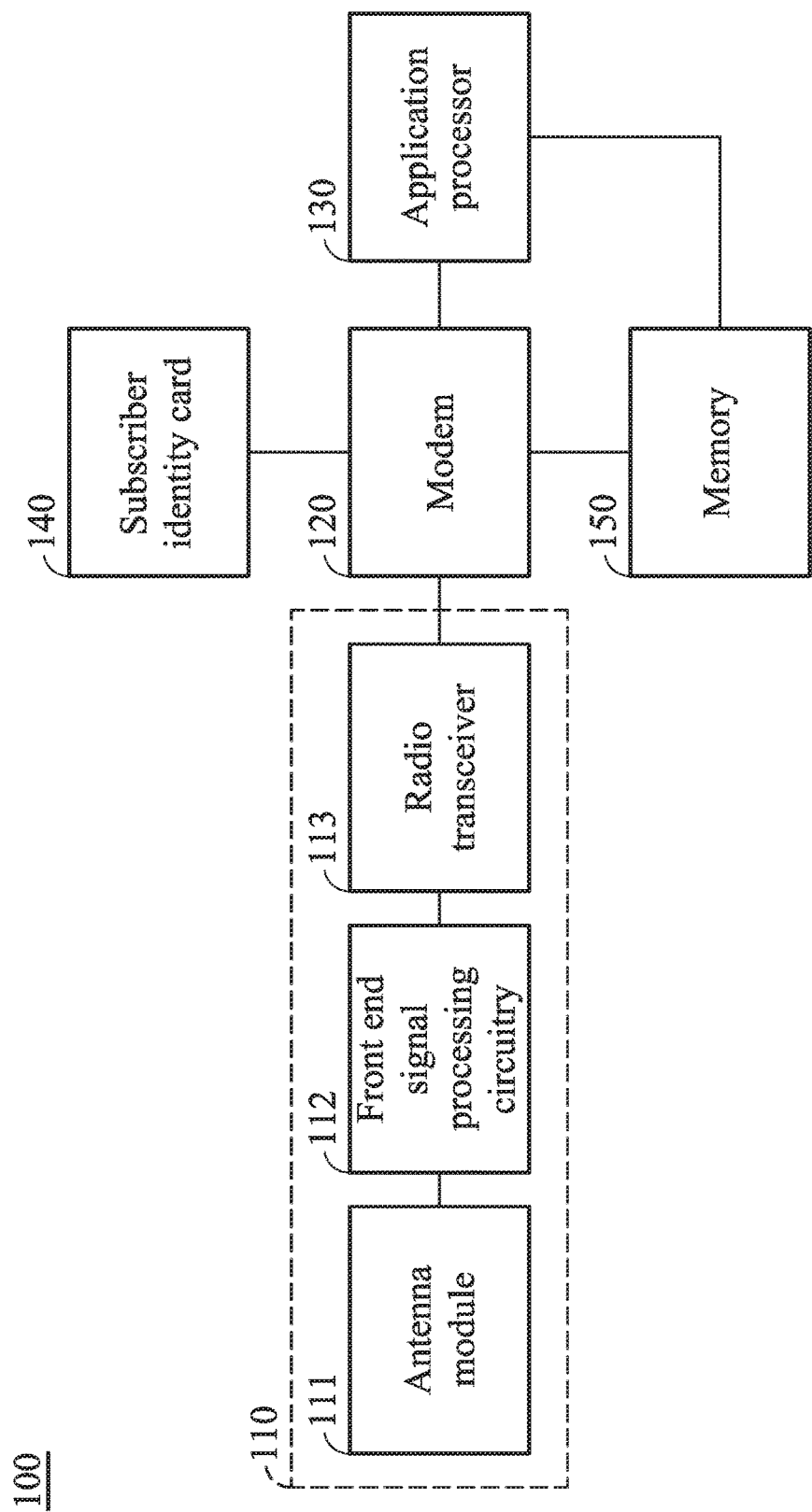
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least a radio frequency (RF) signal processing device 110, a modem 120, an application processor 130, a subscriber identity card 140, and a memory device 150. The RF signal processing device 110 is capable of supporting multi-band RF signal processing and may comprise an antenna module 111, a front end signal-processing circuitry 112 and a radio transceiver 113. According to an embodiment of the invention, the radio frequency may be, for example, 900 MHz or 1800 MHz for a Global System for Mobile communication (GSM), or 1900 MHz for a Universal Mobile Telecommunications System (UMTS), or the frequency of any specific frequency band for a Long-Term Evolution (LTE) system, etc.

The RF signal processing device 110 is capable of transmitting or receiving wireless RF signals to or from an air interface via the antenna module 111. The antenna module 111 may comprise one or more antennas and one or more antenna switches (when required). The front end signal-processing circuitry 112 may comprise a plurality of signal-processing circuits for processing the RF signals (noted that which may be regarded as the external signal-processing circuits when viewing from the point of the radio transceiver 113). The front end signal-processing circuitry 112 may process the RF signals received from the antenna module 111 (i.e. the downlink signals) and then transmit the RF signals to the radio transceiver 113, or process the RF signals received from the radio transceiver 113 (i.e. the uplink signals) and then transmit the RF signals to the antenna module 111.

The radio transceiver 113 is capable of transmitting or receiving the wireless RF signals and may comprise a plurality of internal signal-processing circuits for processing the RF signals. For example, the radio transceiver 113 may convert the received RF signals into intermediate frequency (IF) or baseband signals to be processed, or receive the IF or baseband signals from the modem 120 and convert the received signals into wireless RF signals to be transmitted to a network device. According to an embodiment of the invention, the network device may be a cell, an evolved node B, a base station, a Mobility Management Entity (MME) etc., at the network side and communicating with the communications apparatus 100 via the wireless radio frequency signals.

The modem 120 may be a cellular communications modem configured for handling cellular system communications protocol operations and processing the IF or baseband signals received from or to be transmitted to the radio transceiver 113. The application processor 130 is configured for running the operating system of the communications apparatus 100 and running application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1.

It should be noted that, although FIG. 1 shows a single-card single-standby application, the invention should not be limited thereto. For example, in some embodiments of the invention, the communications apparatus may comprise multiple subscriber identity cards to support multiple radio access technologies (RATs) communications. In the multiple RATs communications applications, the modem, the radio transceiver, the front end signal-processing circuitry and/or the antenna module may be shared by the subscriber identity cards and may have the capability of handling the operations of multiple cellular system communications protocols and processing the corresponding RF, IF or baseband signals in compliance with multiple cellular system communications protocols. Those who are skilled in this technology can still make various alterations and modifications based on the descriptions given above to derive the communications apparatuses comprising multiple radio transceivers and/or multiple antenna modules for supporting multiple RAT wireless communications without departing from the scope and spirit of this invention. Therefore, in some embodiments of the invention, the communications apparatus may be designed to support a multi-card multi-standby application by making some alterations and modifications.

It should be noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be noted that in some embodiments of the invention, the communications apparatus may further support multiple IMSIs.

Figure 2:
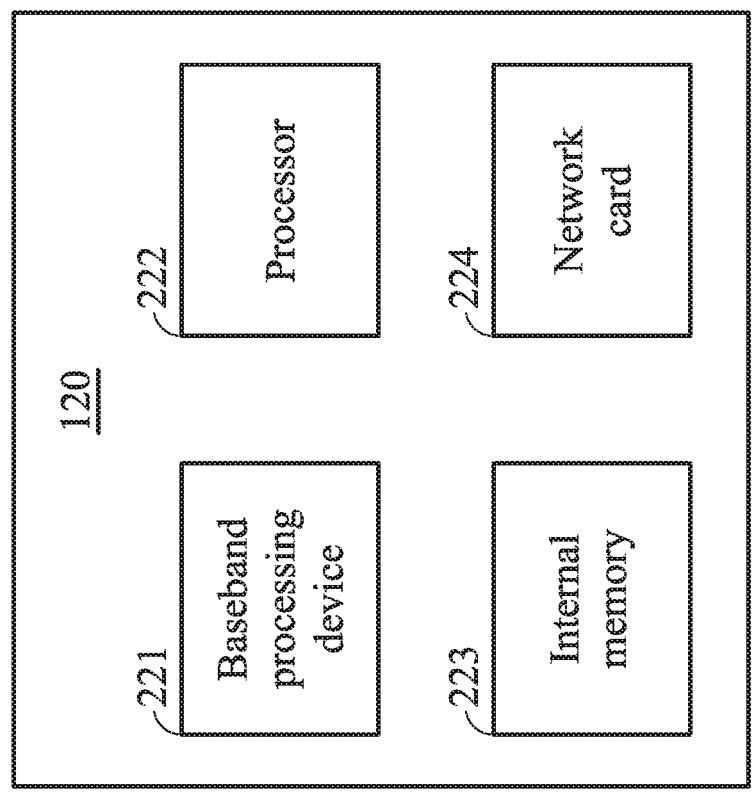
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 113 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, a encoder for signal encoding, a decoder for signal decoding, and so on.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In a preferred embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem or the communications apparatus may also be coupled to an external network card for providing Internet access services. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be noted that in some embodiments of the invention, the modem may comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be noted that in some embodiments of the invention, the baseband processing device 221 and the processor 222 may be integrated into one processing unit, and the modem may comprise one or more a plurality of such processing units, for supporting multi-RAT operations. Therefore, the invention should not be limited to what is shown in FIG. 2.

Figure 3:
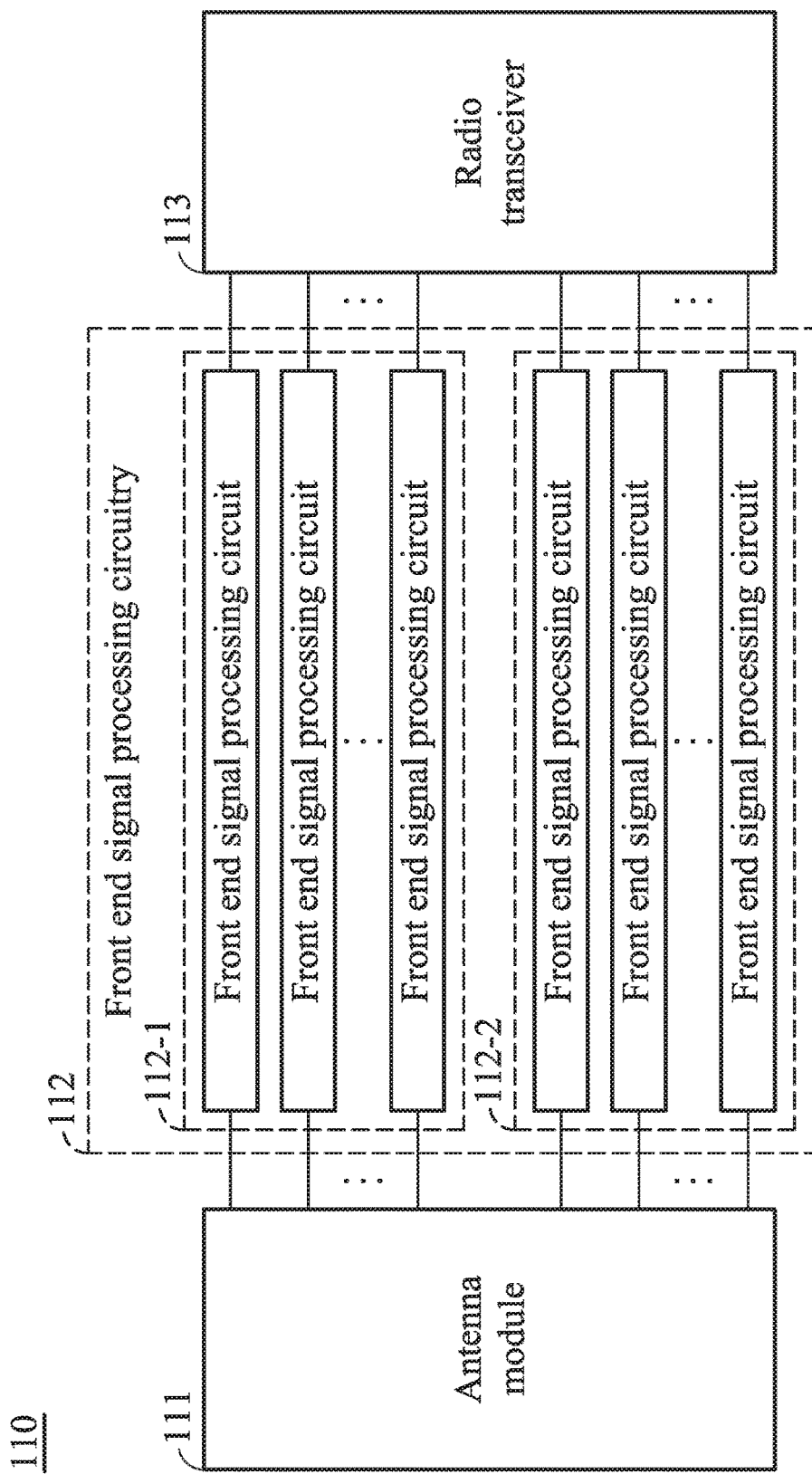
FIG. 3 shows an exemplary block diagram of an RF signal processing device according to an embodiment of the invention.

FIG. 3 shows an exemplary block diagram of an RF signal processing device according to an embodiment of the invention. As shown in FIG. 3, the front end signal-processing circuitry 112 may comprise a plurality of signal-processing circuits (e.g. the external signal-processing circuits discussed above called front end signal-processing circuits). For RF signal reception, there may be a plurality of signal receive paths distributed between the antenna module 111 and the radio transceiver 113, and the signal-processing circuits are configured on the signal receive paths.

According to an embodiment of the invention, the antenna module 111 may comprise at least one primary antenna and at least one diversity antenna to support antenna diversity. The signal receive paths coupled to the primary antenna for receiving the primary signals are the primary signal receive paths, and the signal receive paths coupled to the diversity antenna for receiving the diversity signals are the diversity signal receive paths. As shown in FIG. 3, the signal-processing circuits 112-1 are configured on the primary signal receive paths for processing the primary signals, and the signal-processing circuits 112-2 are configured on the diversity signal receive paths for processing the diversity signals.

Each front end signal-processing circuit (e.g. the signal-processing circuits in 112-1 and 112-2) may comprise one or more signal processing hardware devices, such as a low noise amplifier LNA or a power amplifier for amplifying the RF signals, a filter for filtering unwanted portions of the RF signals, a mixer and an oscillator for performing frequency conversion, an ADC for performing analog-to-digital conversion, or any other signal processing hardware device.

The radio transceiver 113 is coupled to the primary signal receive paths and diversity signal receive paths and comprises a plurality of signal-processing circuits (the internal signal-processing circuits inside of the radio transceiver 113 to distinguish between the signal-processing circuits 112-1 and 112-2 outside of the radio transceiver 113) for processing the RF signals. The radio transceiver 113 may be a chip or an integrated circuit and may comprise a plurality of receive ports coupled to the primary signal receive paths and diversity signal receive paths for receiving the RF signals therefrom.

The radio transceiver 113 may also comprise one or more signal processing hardware devices. For example, the radio transceiver 113 may comprise one or more of a low noise amplifier LNA or a power amplifier for amplifying the RF signals, a filter for filtering unwanted portions of the RF signals, a mixer and an oscillator for performing frequency conversion, an ADC for performing analog-to-digital conversion, or any other signal processing hardware device.

It should be noted that the configurations of the signal processing hardware devices in the signal-processing circuits 112-1 and 112-2 and the signal processing hardware devices in the radio transceiver 113 may be flexibly designed according to different circuit or chip requirements. Therefore, the invention should not be limited to any specific implementation method.

Figure 4:
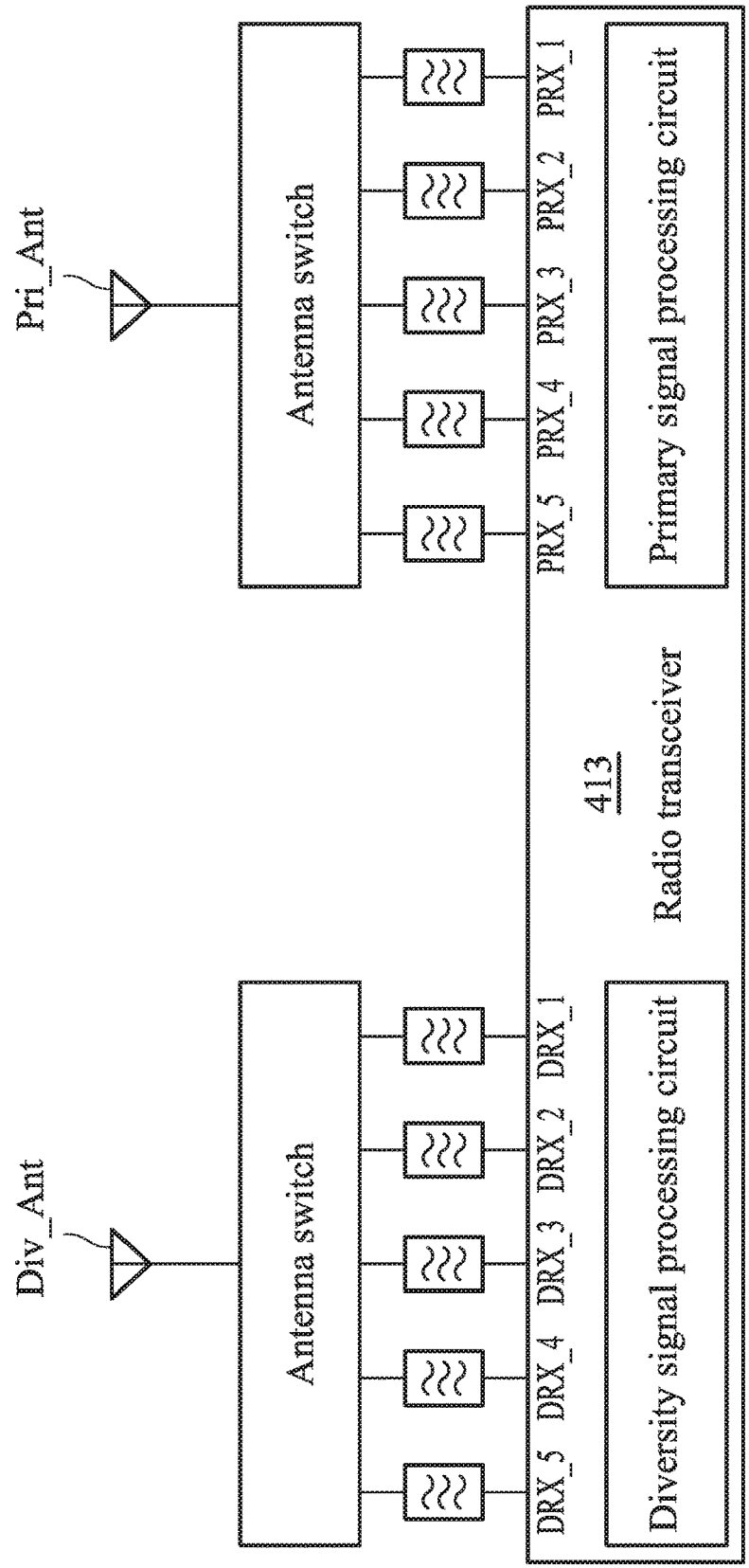
FIG. 4 is an exemplary diagram showing the configuration of multiple signal receive paths to support antenna diversity.

FIG. 4 is an exemplary diagram showing the configuration of multiple signal receive paths to support antenna diversity. The radio transceiver 413 may comprise a plurality of primary receive ports PRX_1-PRX_5 and a plurality of diversity receive ports DRX_1-DRX_5, each of which is coupled to one signal receive path. The primary receive ports PRX_1-PRX_5 are coupled to the primary signal receive paths for receiving the signals from the primary antenna Pri_Ant. The diversity receive ports DRX_1-DRX_5 are coupled to the diversity signal receive paths for receiving the signals from the diversity antenna Div_Ant. For simplicity, the filters drawn on the primary signal receive paths and the diversity signal receive paths are utilized to represent the components in the corresponding front end signal-processing circuits.

The primary receive ports PRX_1-PRX_5 are coupled to the corresponding primary signal-processing circuit inside of the radio transceiver for processing the primary signals. The diversity receive ports DRX_1-DRX_5 are coupled to the corresponding diversity signal-processing circuit inside of the radio transceiver for processing the diversity signals.

Since signal processing may be different for the primary signals and the diversity signals, based on the design shown in FIG. 4, the primary signals can only be received by the primary receive ports and the diversity signals can only be received by the diversity receive ports. In this manner, the number of communications bands supported by the radio transceiver 413 is limited to the number of receive ports.

Once the communications apparatus manufacturer who uses such a radio transceiver wants to increase the number of communications bands supported by the communications apparatus, the only way to achieve this goal is to use an external switch outside of the radio transceiver chip. However, since an external switch has to be disposed on the printed circuit board, the path loss will be increased. In addition, an extra control pin is required to control the external switch outside of the radio transceiver chip. Furthermore, the external switch requires a certain circuit area and also increases the cost.

In order to provide flexibility for the communications apparatus manufacturers to extend the number of supported bands and also to avoid the above-mentioned drawbacks, novel designs of the radio transceiver 113 are provided. One or more signal paths are created inside of the radio transceiver 113 (that is, inside of the radio transceiver chip), so that the receive ports of the radio transceiver 113 are no longer limited to only receiving signals from a fixed signal path. Based on the novel designs, a primary receive port can be used to receive either a primary signal or a diversity signal. Similarly, a diversity receive port can be used to receive either a primary signal or a diversity signal. Therefore, the number of communications bands supported by the radio transceiver 113 can be flexibly extended. That is, the number of communications bands supported by the radio transceiver 113 can be greater than the number of receive ports of the radio transceiver 113. The proposed designs are discussed in the following paragraphs.

Figure 5:
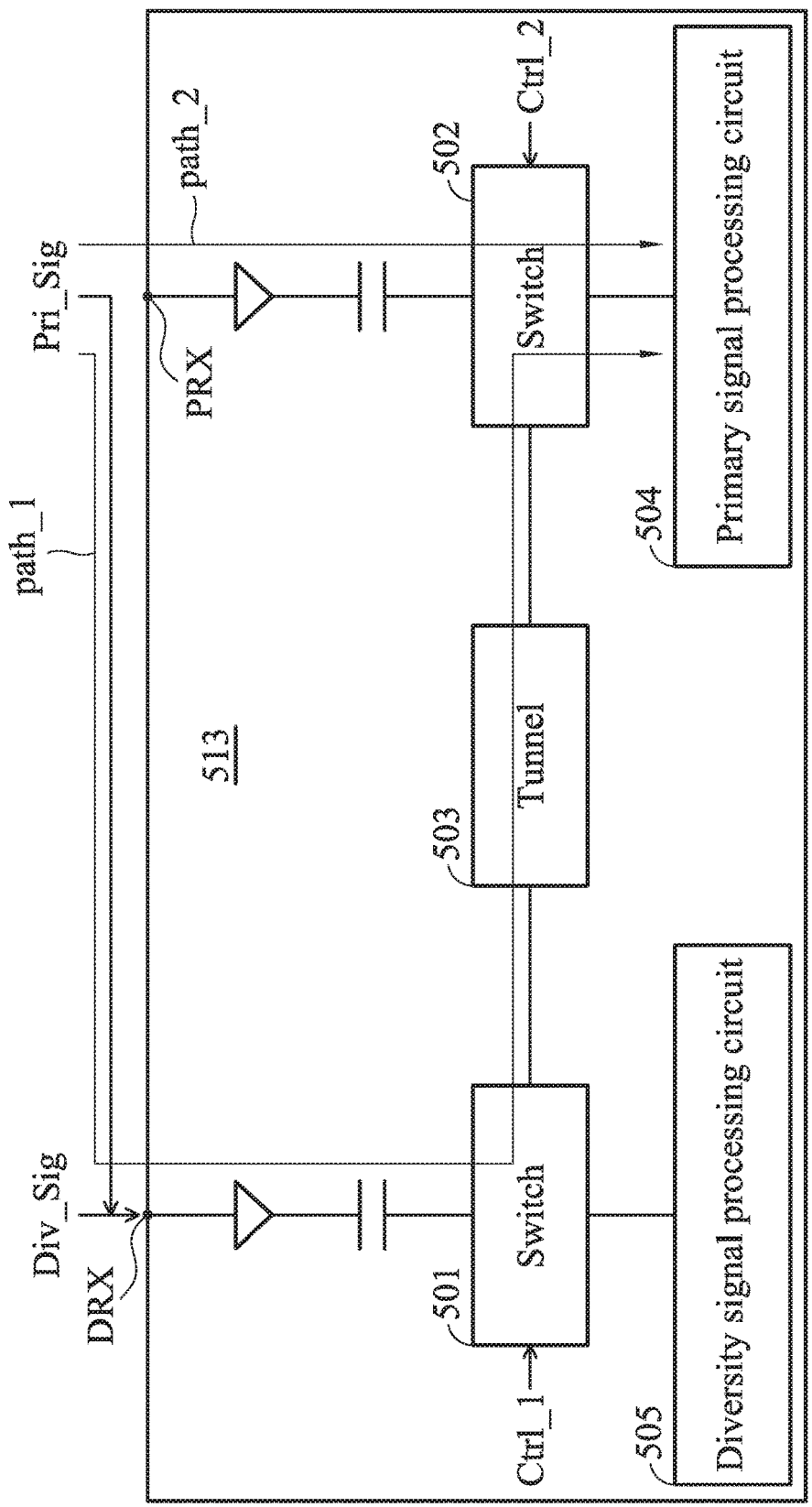
FIG. 5 shows an exemplary circuit diagram of a radio transceiver according to an embodiment of the invention.

FIG. 5 shows an exemplary circuit diagram of a radio transceiver according to an embodiment of the invention. The radio transceiver 513 may comprise at least one receive port that is designed to be able to receive a primary signal Pri_Sig or a diversity signal Div_Sig. The primary signal Pri_Sig refers to the signal received from the primary antenna Pri_Ant and the diversity signal Div_Sig refers to the signal received from the diversity antenna Div_Ant.

As shown in FIG. 5, the diversity receive port DRX is capable of receiving a primary signal Pri_Sig or a diversity signal Div_Sig. That is, based on different system requirements, the diversity receive port DRX may be utilized to receive a primary signal Pri_Sig or a diversity signal Div_Sig. Note that in other embodiments of the invention, the primary receive port PRX may also be designed to be capable of receiving a primary signal Pri_Sig or a diversity signal Div_Sig. Therefore, it should be understood that for the purposes of simplicity, FIG. 5 only shows one of a plurality of possible implantations.

The radio transceiver 513 may further comprise switches 501 and 502 and a tunnel device 503. The switches 501 and 502 may be any on-chip switching circuits and the tunnel device may be an on-chip tunnel device. The switch 501 may be coupled between the diversity receive port DRX and a diversity signal-processing circuit 505 (the internal signal-processing circuits inside of the radio transceiver 513). The switch 501 may also be coupled to a capacitor for DC blocking and an amplifier for amplifying the received signal. The switch 501 may be utilized to control a signal path in response to a control signal Ctrl_1.

The switch 502 may be coupled between the primary receive port PRX and a primary signal-processing circuit 504 (the internal signal-processing circuits inside of the radio transceiver 513). The switch 502 may also be coupled to a capacitor for DC blocking and an amplifier for amplifying the received signal. The switch 502 may be utilized to control a signal path in response to a control signal Ctrl_2. The tunnel device 503 may be coupled between the switch 501 and the switch 502.

Note that the switches 501 and 502 and tunnel device provide an on-chip signal path inside of the radio transceiver 513, so that the diversity receive port DRX can be flexibly designed to receive the primary signal Pri_Sig or the diversity signal Div_Sig. The path loss of the on-chip signal path is much less than the signal path routed on the printed circuit board.

According to an embodiment of the invention, when the diversity receive port DRX is designed to receive the diversity signal Div_Sig, the diversity signal Div_Sig is transferred to the diversity signal-processing circuit 505 under the control of the switch 501. When the diversity receive port DRX is configured to receive the primary signal Pri_Sig, the primary signal Pri_Sig is transferred to the primary signal-processing circuit 504 via the tunnel device 503 and switches 501 and 502 the under the control of the switches 501 and 502.

According to an embodiment of the invention, the control signals Ctrl_1 and Ctrl_2 may be issued by the processor 222. To be more specific, a manufacturer using the radio transceiver 513 to design a communications apparatus product may determine whether to use the diversity receive port DRX to receive a diversity signal or a primary signal. When the use of a diversity receive port DRX to receive the diversity signal is determined, the diversity receive port DRX may be electrically connected to a diversity signal receive path. On the other hand, when use of a diversity receive port DRX to receive the primary signal is determined, the diversity receive port DRX may be electrically connected to a primary signal receive path. The diversity signal receive path and primary signal receive path are comprised in the front end signal-processing circuitry as illustrated above and configured on a printed circuit board, and the electrical connections may be achieved by using a signals traces routed on the printed circuit board to connect the diversity receive port DRX to the corresponding diversity signal receive path or primary signal receive path.

In addition, a predetermined band of the primary signal Pri_Sig to be received by the diversity receive port DRX may be predefined in a predetermined band list. When the processor 222 determines that the receiving band of a signal to be received is in the predetermined band list, the processor 222 may issue the control signals Ctrl_1 and Ctrl_2 to control the switches 501 and 502, so that the primary signal Pri_Sig can be transferred from the diversity receive port DRX via the switches 501 and 502 and the tunnel device 503 to the primary signal-processing circuit 504.

In addition, the processor 222 may also issue corresponding commands to disable or turn off one or more components in the diversity signal-processing circuit 505 that will not be used, to save power.

When use of a diversity receive port DRX to receive the diversity signal Div_Sig is determined, the processor 222 may issue the control signals Ctrl_1 and Ctrl_2 to control the switches 501 and 502, so that the diversity signal Div_Sig can be transferred from the diversity receive port DRX via the switch 501 to the diversity signal-processing circuit 505.

Note that in the embodiment shown in FIG. 5, the primary receive port PRX may be designed to receive the primary signal, and the primary signal is transferred to the primary signal-processing circuit 504 under the control of the switch 502. In this manner, the primary signal-processing circuit 504 is shared by the primary receive port PRX and the diversity receive port DRX.

Another predetermined band of the primary signal Pri_Sig to be received by the primary receive port PRX may also be predefined. When the processor 222 determines that the receiving band falls within the other predetermined band, the processor 222 may issue the control signal Ctrl_2 to control the switch 502, such that the primary signal Pri_Sig can be transferred from the primary receive port PRX via the switch 502 to the primary signal-processing circuit 504.

According to an embodiment of the invention, the tunnel device 503 is a signal trace. According to other embodiments of the invention, the tunnel device 503 may also be a signal-processing circuit configured inside of the radio transceiver and comprising one or more signal processing devices (such as the amplifier, filter, . . . etc., as discussed above).

Figure 6:
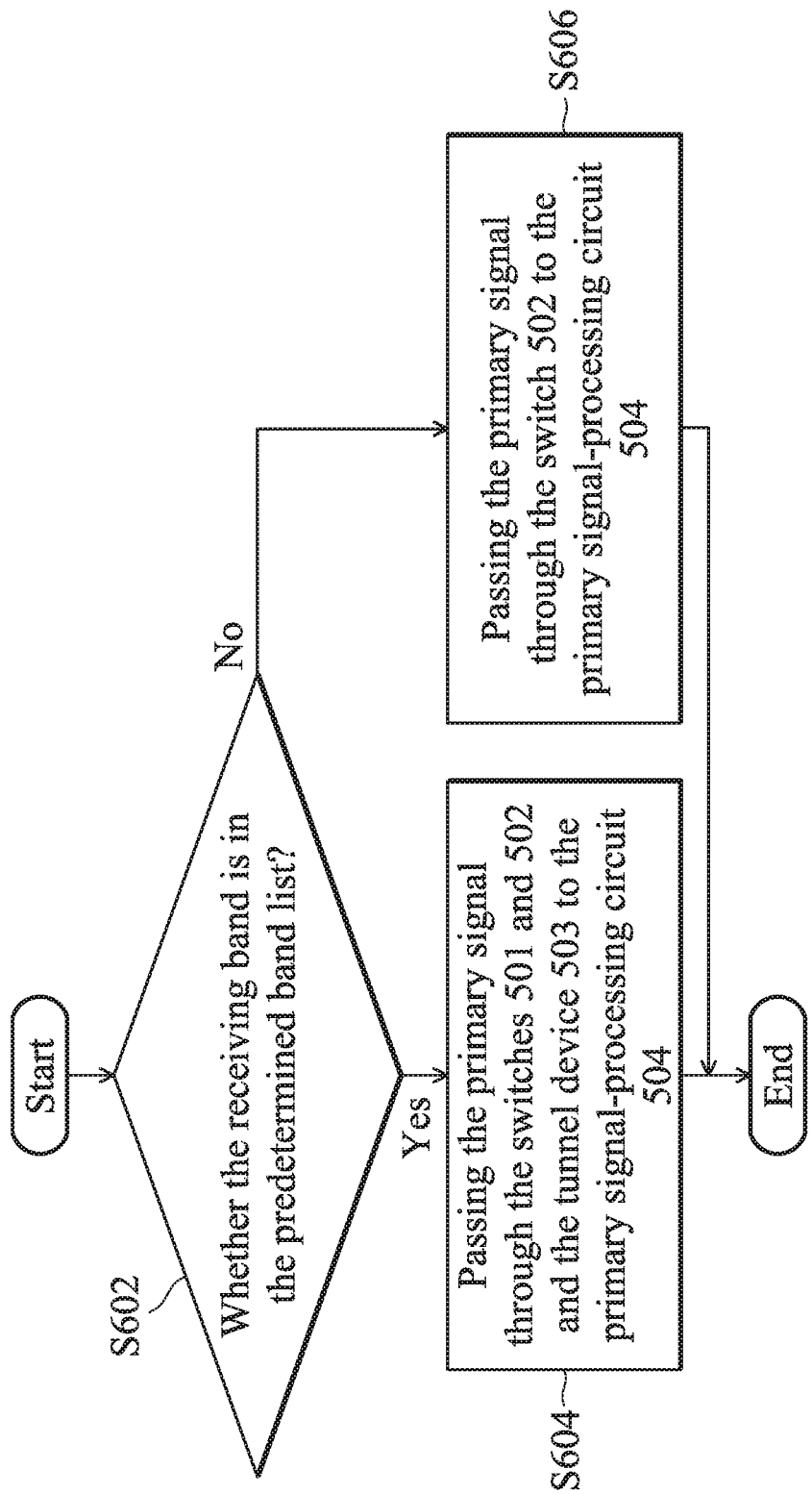
FIG. 6 is a flow chart of a method for controlling the signal path according to an embodiment of the invention.

FIG. 6 is a flow chart of a method for controlling the signal path according to an embodiment of the invention. In the embodiment, a diversity receive port (e.g. the diversity receive port DRX) is designed to receive the primary signal. A predetermined band of the primary signal to be received by the diversity receive port is predefined in the predetermined band list. The processor 222 may determine whether the receiving band of a signal to be received is in the predetermined band list (Step S602). If so, the primary signal is passed through the diversity receive port DRX, the switch 501, the tunnel device 503 and the switch 502 and then to the corresponding primary signal-processing circuit 504 (shown as the path_1 in FIG. 5) (Step S604). The processor 222 may issue the corresponding control signals Ctrl_1 and Ctrl_2 for controlling the statuses of the switches 501 and 502, so as to direct the primary signal from the diversity receive port DRX to the primary signal-processing circuit. If not, the primary signal is passed through the primary receive port, the switch 502 and then to the corresponding primary signal-processing circuit 504 (shown as the path_2 in FIG. 5) (Step S606).

Figure 7:
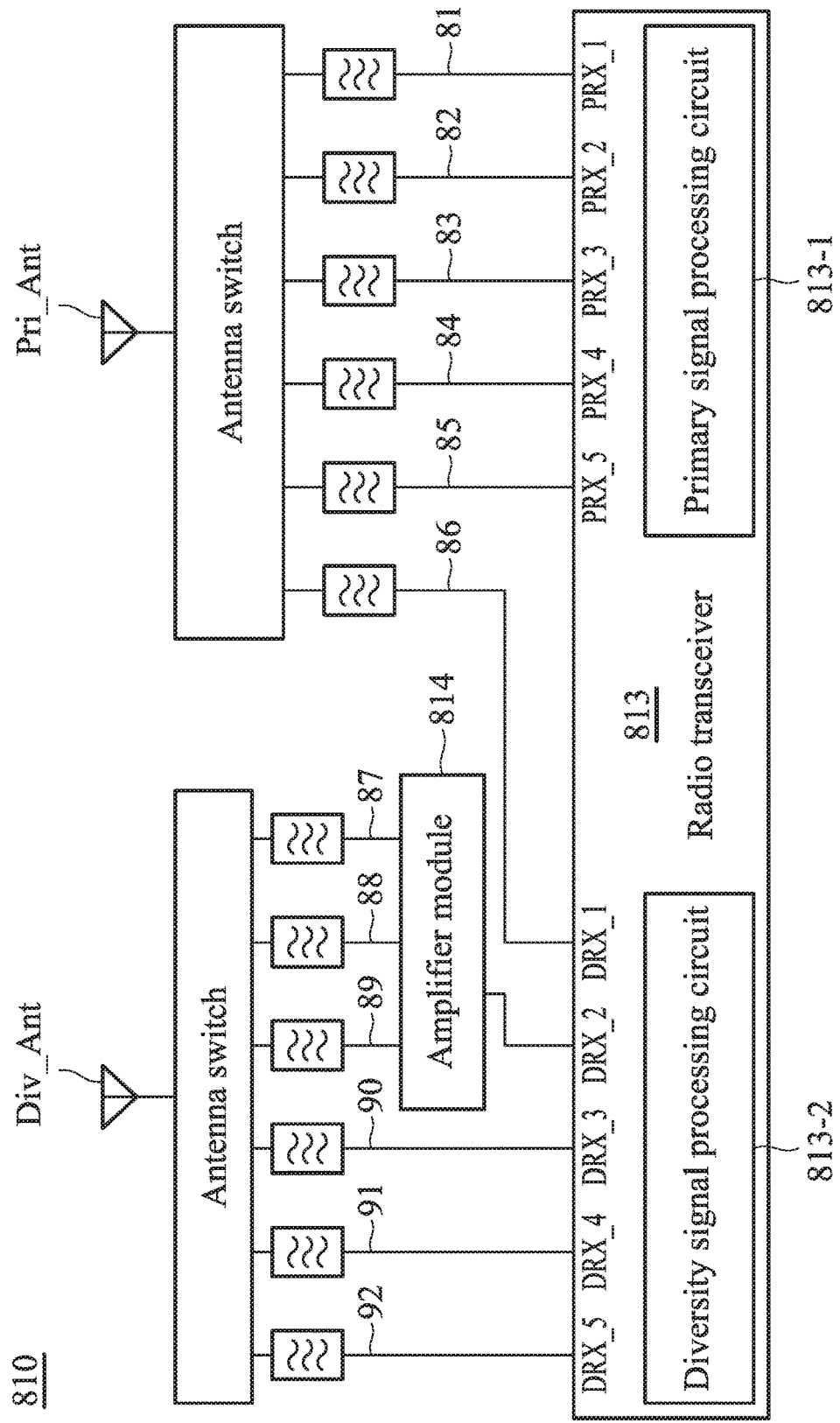
FIG. 7 shows an exemplary circuit diagram of an RF signal processing device according to an embodiment of the invention.

FIG. 7 shows an exemplary circuit diagram of an RF signal processing device according to an embodiment of the invention. The RF signal processing device 810 may comprise six primary signal receive paths 81-86 for receiving the primary signals transmitted in different bands from the primary antenna Pri_Ant, and comprise six diversity signal receive paths 87-92 for receiving the diversity signals transmitted in different bands from the diversity antenna Div_Ant.

The radio transceiver 813 may comprise five primary receive ports PRX_1-PRX_5 and five diversity receive ports DRX_1-DRX_5. The internal primary signal-processing circuit 813-1 of the radio transceiver 813 is designed for processing the primary signals. The internal primary signal-processing circuit 813-1 may comprise one or more signal processing paths. Each signal processing path may comprise one or more signal processing devices. The internal diversity signal-processing circuit 813-2 of the radio transceiver 813 is designed for processing the diversity signals. The internal diversity signal-processing circuit 813-2 may comprise one or more signal processing paths. Each signal processing path may comprise one or more signal processing devices.

As shown in FIG. 7, at least one diversity receive port DRX_1 is coupled to the primary signal receive path to receive the primary signal, so as to extend the number of supported primary bands. The diversity receive port DRX_may be coupled to the primary signal-processing circuit 813-1 via the switches and tunnel device configured inside of or integrated into the radio transceiver as per the embodiment shown in FIG. 5. In this manner, the number of primary signal receive paths and the number of supported primary bands can be greater than the number of primary receive ports.

In addition, the diversity signal receive paths 87, 88 and 89 may be further coupled to an amplifier module 814, such as an LNA module. The amplifier module 814 may also provide a switch function for selectively connecting one of the diversity signal receive paths 87, 88 and 89 to the diversity receive port DRX_2. In this manner, when the number of diversity signal receive paths is equal to or greater than the number of diversity receive ports, at least one diversity receive port may still be designed to receive the primary signal when required.

It should be noted that the number of primary/diversity signal receive paths and the number of primary/diversity receive ports shown in FIG. 7 are only an exemplary design, and the invention should not be limited thereto. It should be further noted that in other embodiments, the primary receive port may also be designed to be coupled to the diversity signal receive path to receive the diversity signal, so as to extend the number of supported diversity bands. Therefore, the invention should not be limited thereto.

It should be further noted that, for simplicity, the filters drawn on the primary signal receive paths and the diversity signal receive paths are utilized to represent the components in the corresponding front end signal-processing circuits.

As discussed above, for the radio transceiver design as shown in FIG. 4, the number of communications bands supported by the radio transceiver is limited to the number of receive ports, and the number of receive ports is fixed when the radio transceiver chip was made. In addition, for the radio transceiver design as shown in FIG. 4, the diversity receive port can only receive the diversity signal, and cannot be used to receive the primary signal. Similarly, the primary receive port can only receive the primary signal, and cannot be used to receive the diversity signal (since the internal primary signal processing and diversity signal processing may be different).

However, in the embodiments of the invention, one or more signal paths are created inside of the radio transceiver (that is, inside of the radio transceiver chip), such that the receive ports of the radio transceiver are no longer limited to only receiving signals from a fixed signal path. Based on the proposed designs, since a primary receive port can be flexibly used to receive the primary signal or the diversity signal, and a diversity receive port can be flexibly used to receive the primary signal or the diversity signal as well, the number of communications bands supported by the communications apparatus will no longer be limited to the number of receive ports of the radio transceiver, and can be flexibly increased. That is, the number of communications bands supported by the communications apparatus can be greater than the number of receive ports of the radio transceiver.

In addition, as discussed above, when using an external switch on the printed circuit board to increase the number of supported bands, the path loss will be increased. In addition, an extra control pin is required to control the external switch outside of the chip. Furthermore, the external switch requires a certain circuit area and also increases the cost.

However, in the embodiments of the invention, since the switches and tunnel device shown in FIG. 5 provide an on-chip signal path inside of the radio transceiver 513, the path loss of the on-chip signal path is much less than the path loss when using an external switch. The control mechanism for controlling the internal switch is also simpler than using an extra control pin. The circuit area and cost required when using the internal switch are also much lower than when using an external switch.

Therefore, based on the proposed designs, the flexibility of increasing the number of supported bands can be provided to communications apparatus manufacturers who use the radio transceiver chip with the proposed design. In addition, the path loss, the circuit area and the cost can also be greatly reduced.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An RF signal processing device, capable of supporting multi-band RF signal processing, comprising:
    a plurality of first signal receive paths, receiving a plurality of first signals from a first antenna;
    a plurality of second signal receive paths, receiving a plurality of second signals from a second antenna; and
    a radio transceiver, comprising:
    a first signal-processing circuit, designed for processing the first signals;
    a second signal-processing circuit, designed for processing the second signals;
    a plurality of first receive ports, coupled to the first signal-processing circuit;
    a plurality of second receive ports, coupled to the second signal-processing circuit,
    a first switch, coupled between at least one first receive port and the first signal-processing circuit; and
    a tunnel device, coupled between the first switch and the second signal-processing circuit,
    wherein the at least one first receive port coupled to the first switch is utilized to receive a first signal among the plurality of first signals or a second signal among the plurality of second signals, and
    wherein when the at least one first receive port receives the second signal, the second signal is transferred to the second signal-processing circuit via the tunnel device under the control of the first switch.

2. The RF signal processing device as claimed in claim 1, wherein when the at least one first receive port receives the first signal, the first signal is transferred to the first signal-processing circuit under the control of the first switch.

3. The RF signal processing device as claimed in claim 1, wherein the number of second signal receive paths is greater than the number of second receive ports.

4. The RF signal processing device as claimed in claim 1, wherein the first receive ports are diversity/primary receive ports and the second receive ports are primary/diversity receive ports.

5. The RF signal processing device as claimed in claim 2, wherein the radio transceiver further comprises:
    a second switch, coupled between the second signal-processing circuit and the tunnel device,
    wherein when the at least one first receive port receives the second signal, the second signal is transferred to the second signal-processing circuit further via the second switch under the control of the second switch.

6. The RF signal processing device as claimed in claim 1, wherein the tunnel device is a signal trace.

7. A communications apparatus, capable of supporting multi-band RF signal processing, comprising:
    at least one primary antenna, coupled to a plurality of primary signal receive paths and receiving a plurality of primary signals;
    at least one diversity antenna, coupled to a plurality of diversity signal receive paths and receiving a plurality of diversity signals;
    a front end signal-processing circuitry, comprising a plurality of signal-processing circuits on the primary signal receive paths and the diversity signal receive paths; and
    a radio transceiver, comprising:
    a primary signal-processing circuit, designed for processing the primary signals;
    a diversity signal-processing circuit, designed for processing the diversity signals;
    one or more primary receive ports, coupled to the primary signal-processing circuit;
    one or more diversity receive ports, coupled to the diversity signal-processing circuit,
    a first switch, coupled between at least one diversity receive port and the diversity signal-processing circuit; and
    a tunnel device, coupled between the first switch and the primary signal-processing circuit,
    wherein the at least one diversity receive port coupled to the first switch is further coupled to the primary signal-processing circuit via the tunnel device, and
    wherein when the at least one diversity receive port receives the primary signal, the primary signal is transferred to the primary signal-processing circuit via the tunnel device under the control of the first switch.

8. The RF signal processing device as claimed in claim 7, wherein the at least one diversity receive port coupled to the first switch is utilized to receive the diversity signal or the primary signal.

9. The RF signal processing device as claimed in claim 7, wherein at least one primary signal is received by the radio transceiver via the at least one diversity receive port, and then processed by the primary signal-processing circuit.

10. The RF signal processing device as claimed in claim 7, wherein when the at least one diversity receive port receives the diversity signal, the diversity signal is transferred to the diversity signal-processing circuit under the control of the first switch.

11. The RF signal processing device as claimed in claim 7, wherein the number of primary signal receive paths is greater than the number of primary receive ports.

12. The RF signal processing device as claimed in claim 11, wherein the radio transceiver further comprises:
    a second switch, coupled between the primary signal-processing circuit and the tunnel device, wherein when the at least one diversity receive port receives the primary signal, the primary signal is transferred to the primary signal-processing circuit further via the second switch under the control of the second switch.

13. The RF signal processing device as claimed in claim 7, wherein the tunnel device is a signal trace.

* * * * *